Figure 1:
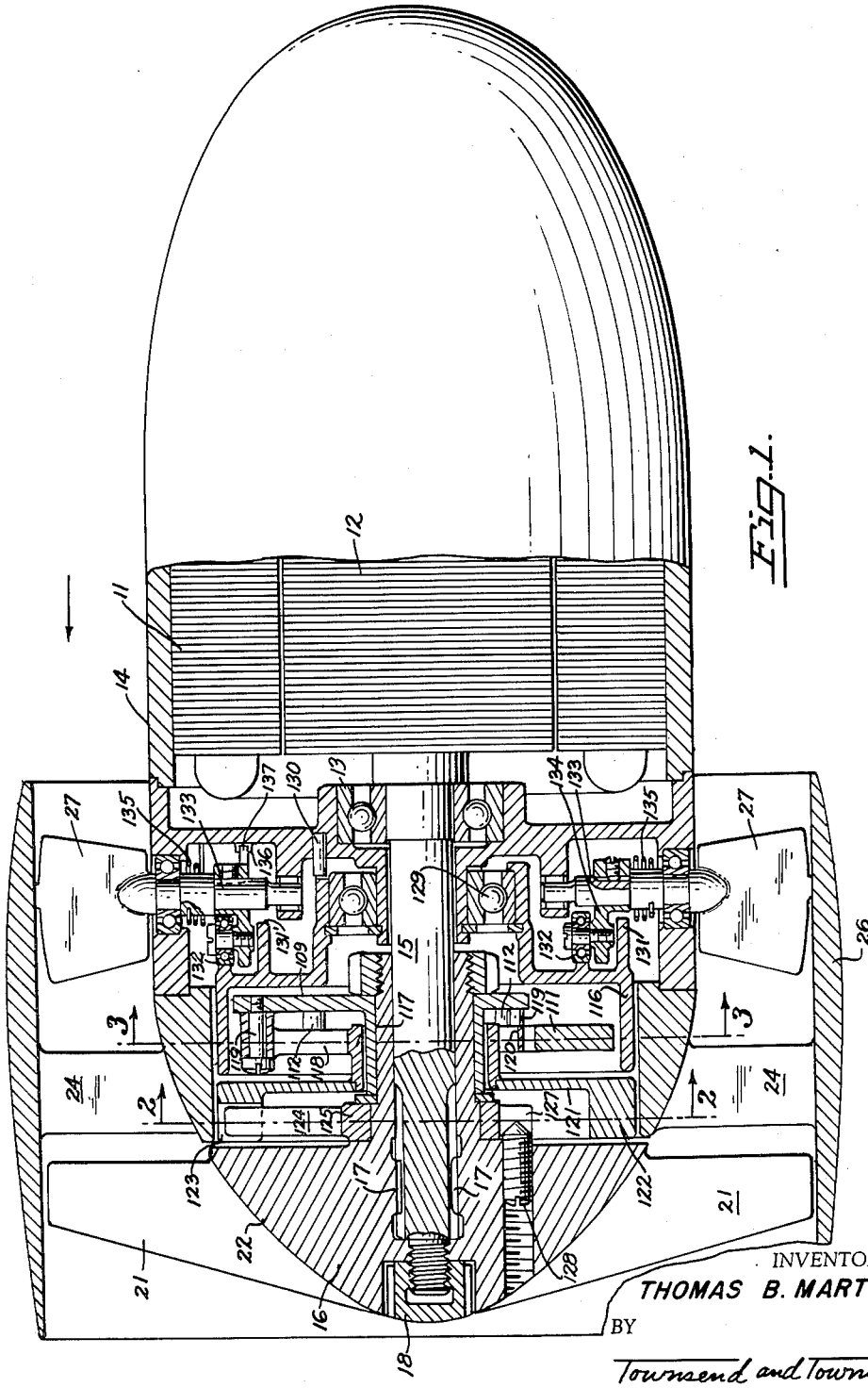

Nov. 20, 1962 T. B. MARTIN 3,064,942
EMERGENCY RAM AIR POWER SUPPLY
Filed Sept. 3, 1957 3 Sheets-Sheet 1

INVENTOR.
THOMAS B. MARTIN
BY
Townsend and Townsend
ATTORNEYS

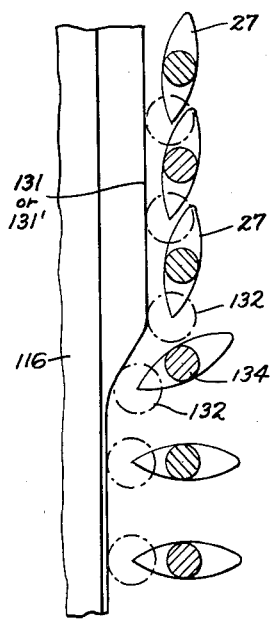
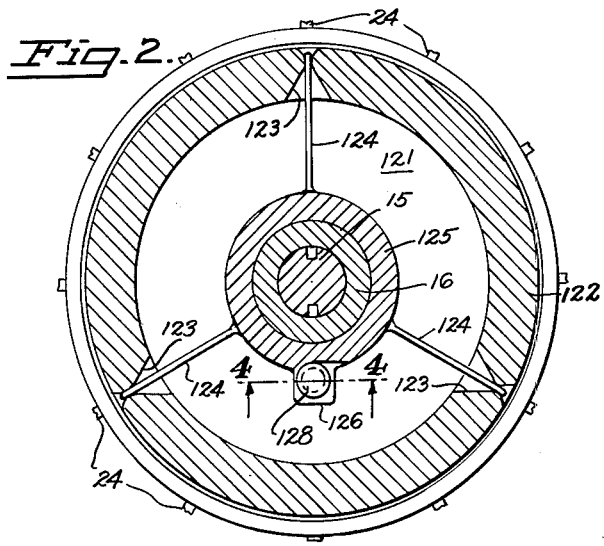
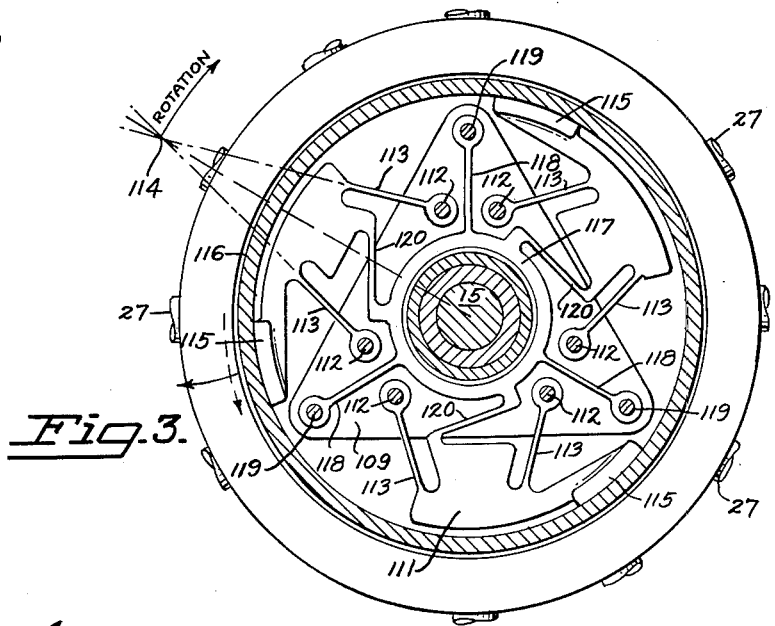
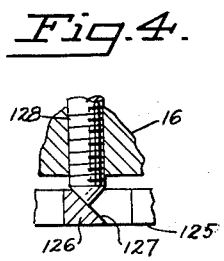

Nov. 20, 1962 T. B. MARTIN 3,064,942
EMERGENCY RAM AIR POWER SUPPLY
Filed Sept. 3, 1957 3 Sheets-Sheet 3
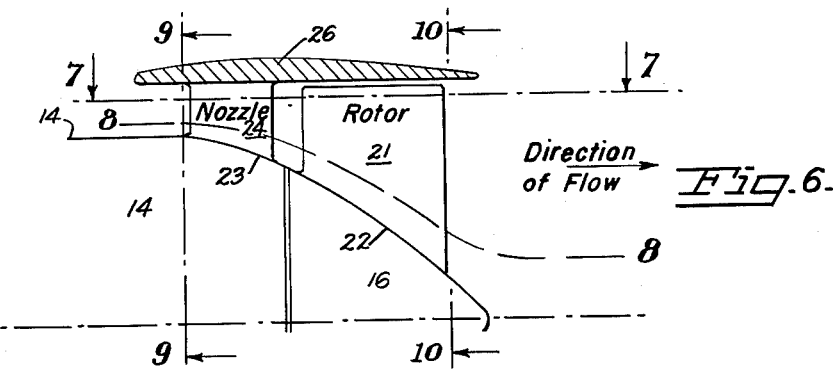
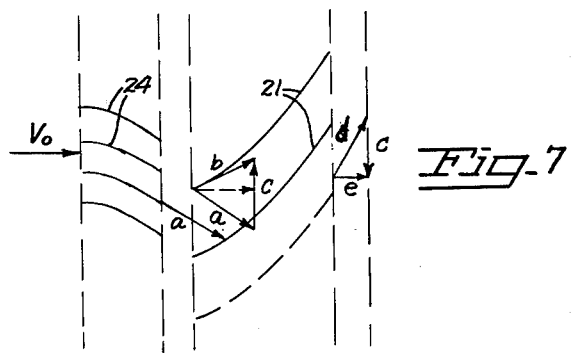
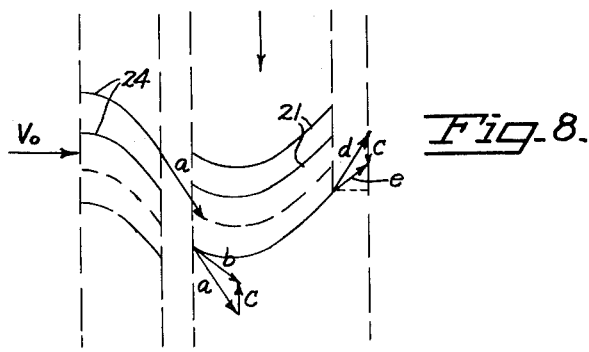
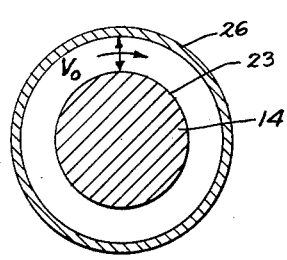
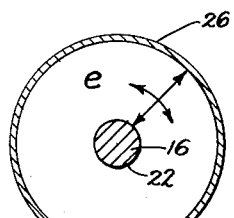
INVENTOR.
THOMAS B. MARTIN
BY
Townsend and Townsend
ATTORNEYS … # 3,064,942
Patented Nov. 20, 1962

3,064,942
EMERGENCY RAM AIR POWER SUPPLY
Thomas B. Martin, 182 Cross Road, Danville, Calif.
Filed Sept. 3, 1957, Ser. No. 681,589
11 Claims. (Cl. 253—59)

This invention relates to a new and improved emergency ram air power supply of the type installed in an aircraft to operate auxiliary equipment when the main power supply fails. Thus the mechanism illustrated and herein described may be installed on the exterior of the aircraft to operate as an air turbine to drive electric generators to operate radios, lights or similar auxiliary equipment or else to operate a hydraulic pump. Particularly where the air turbine is used to operate an electric generator it is desirable to employ a speed governor to hold the speed within close limits. Accordingly the present invention incorporates such a governor. It will be understood that other types of governors than that illustrated herein may be employed and it will be further understood that the form of governor herein illustrated may be employed in other installations.

A principal object and advantage of the present invention is the provision of a turbine having a substantially cylindrical shroud ring and having positioned within the confines of the shroud ring a generator or other prime mover having a hub of diminishing diameter, all as hereinafter described in detail. The rotatable member of the turbine is formed with a plurality of blades of particular configuration. Immediately ahead of such blades are stationary stator blades extending between the stationary portion of the turbine and the shroud ring. Where a governor is employed, adjustable throttle vanes are installed ahead of the stator blades to control the speed.

One of the critical factors in such turbines, from the standpoint of aircraft use, is the power produced per square foot of frontal area and another critical factor is the weight per unit of power. The present invention has particular utility in that the power developed per square foot of frontal area and per pound of weight is very high. In connection with the foregoing critical factors it is another feature of this invention that the shroud ring is substantially constant in both outer diameters and inner diameters, whereas the external configuration of the stationary portion of the turbine and rotor diminish in the direction of air flow.

Another feature of the invention is the design of the stator and rotor blades so as to produce a high turning angle axial flow, all as hereinafter described in detail.

Another object of the present invention is the provision of a speed governor which may be used to control the speed of the turbine or for other purposes. The governor herein described is simple in operation and rugged in construction yet sufficiently sensitive for practical purposes.

One of the features of the invention is the fact that the governor shoe is supported by angularly flexible members which control its outward movement toward a friction ring.

Still another feature of the invention is the fact that the theoretical point about which the shoe is supported for its outward movement toward the ring may be located outside the physical extent of the parts. This construction enables the designer to increase the moment arm of acceleration at will within practical limits, rather than being limited by the physical dimensions of the parts, as is the case in conventional constructions.

Other objects of the present invention will become apparent upon reading the following specification and referring to the accompanying drawings in which similar characters of reference represent corresponding parts in each of the several views.

In the drawings:
FIG. 1 is a longitudinal vertical sectional view through the turbine;
FIG. 2 is a transverse sectional view taken substantially along the line 2—2 of FIG. 1;
FIG. 3 is a transverse sectional view taken substantially along line 3—3 of FIG. 1;
FIG. 4 is a fragmentary sectional view taken substantially along line 4—4 of FIG. 2;
FIG. 5 is an enlarged fragmentary view of the operating mechanism for the speed governing throttle vanes;
FIG. 6 is a schematic view through a portion of the device;
FIGS. 7 and 8 are schematic vector diagrams showing blade shapes and vector relationships correlated to FIG. 6; and
FIGS. 9 and 10 are schematic views showing the outer rotor diameters correlated to FIG. 6.

As illustrated herein, there is provided an electric generator 11 shown schematically herein, which comprises a generator rotor 12 supported by bearings 13 assembled in a generator end casing 14. Generator shaft 15 extends rearward and supports the turbine rotor 16. Driving splines 17 and retaining nut 18 threaded on the end of shaft 15 secure rotor 16 to shaft 15. Projecting from rotor 16 is a plurality of rotor blades 21 of particular configuration, hereinafter described in detail. It will be noted that the external surface 22 of hub 16 diminishes in diameter and further that the external surface 23 of casing 14 likewise diminishes in diameter from front to rear. The relationship of these diameters is an important feature of the present invention. Extending from the diminishing diameter portion 23 of casing 14 is a plurality of stator blades 24, the outer ends of which are recessed in and support a cylindrical shroud ring 26. The length of shroud ring 26 is such as to extend rearwardly of stator blades 24 beyond the rearward tip of rotor 16 and likewise to extend forwardly a similar distance. Likewise disposed between casing 14 and shroud ring 26 is a plurality of throttle vanes 27 which are adjustable in position dependent upon the governor mechanism hereinafter described in detail. Thus the flow of air through the shroud ring 26 is first through the throttle vanes 27 which control the volume of air admitted, thence through the stator blades 24 which control the angle of movement of air and then against and through the rotor blades 21, thereby imparting a turning movement to the rotor 16 which is in turn transmitted to shaft 15 and generator rotor 12. It will be understood that a hydraulic pump (not shown) or other equipment may be used to replace generator 11.

Turning now to FIG. 6, there is shown schematically the shroud ring 26 surrounding casing 14 with nozzle blades 24 projecting from diminishing diameter portion 23 of casing 14 and with rotor blades 21 extending from diminishing diameter portion 22 of rotor 16. The flow of air is decelerated in the axial direction by introducing a whirl in the nozzle at substantially constant channel area, the channel being defined as the space between the blades in the direction of local flow. Thus the air is deflected by the stator or nozzle blades 24 rather than expanded. To accomplish such effect, it is necessary to increase the annulus area between curved casing portion 23 and shroud ring 26. Inasmuch as space requirements on the aircraft prevent increasing the diameter of shroud ring 26, the effect is obtained by reducing the diameter of the hub.

Rotor blades 21 in turn deflect the flow back toward axial and further decelerate the air and this effect likewise requires an increase in the annulus area between rotor hub 16 and shroud ring 26 and is accomplished by curved surface 22 of rotor 16.

The flow of air leaving the rotor should be substantially axial and should fill the full circle of the shroud ring as a low velocity wake and the design of the present invention accomplishes this result.

Blades 21 are connected to hub 16 at their inner end whereas blades 24 are connected to curved portion 23 of casing 14 at one end and also connected to shroud ring 26 at the other end. Blades 21 and 24 are fabricated of sheet metal and may be made of titanium or similar metals, while hub 16 is made of aluminum. Other methods of fabrication and other materials of construction will readily occur to one skilled in the art.

The shapes of blades 21 and 24 are shown along two lines—namely, line 7—7 of FIG. 6 and line 8—8 of FIG. 6. The annulus area of curved portion 23 is shown in FIGS. 9 and 10 taken substantially along lines 9—9 and 10—10, respectively, of FIG. 6.

The velocity of air entering along lines 7—7 or 8—8 is identical and is indicated $v_0$. The nozzle discharge velocity after passing through fixed nozzle blades 24 is indicated as $a$. $b$ is the relative velocity of the air entering rotor blade 21. $c$ is the tangential velocity of the bladed element and it will be seen that this velocity is small near the center of the blade and large at the tip of the blade. $d$ is the relative air velocity on leaving the rotor blade and $e$ is the component of the air velocity in the air stream after leaving the rotor blade.

The construction of the fixed nozzle blades 24 and the curvature of surface 23 are such that $v_0=a$, because there is no change in the magnitude of the velocity due to the constant area in the channel. Similarly the construction of rotor blades 21 and curvature 22 of rotor 16 are such that $b=d$. Accordingly $e$ is smaller than $v_0$, because the annulus area has increased in the process. The difference in velocity is the result of work performed in driving the turbine.

The governor flyweight assembly consists of three flyweights 111 arranged symmetrically 120° apart. Each flyweight is secured to the governor support plate 109 by means of fixed pins 112. Two flexures 113 connect each flyweight mass to its support pins 112 in such a manner that their geometry describes a virtual center of support 114 which is located a substantial radial distance outside of the actual flyweight mechanism. Each flyweight, therefore, acts as if it were supported at this point. The motion of each flyweight is extremely small in order to perform its function and takes place entirely by means of elastic angular deflection in the flexures 113. The fixed end of flexure 113 is rigidly supported against motion by the clamping of pins 112. In response to centrifugal force, the unbalanced mass of the flyweights with respect to point 114 causes flyweight friction shoe 115 to contact cam ring 116. Frictional contact between shoes 115 and ring 116 causes the ring to be turned in the direction of rotation. Angular acceleration of the turbine shaft will also cause the flyweights 111 to be forced into frictional contact with ring 116. A coordinating ring 117 centrally supported by flexures 118 from pins 119 is connected with each flyweight by means of flexure 120 in such a manner that motion of each flyweight must be accompanied by a corresponding rotation of coordinating ring 117. Since each flyweight has an identical connection to coordinating ring 117, all three weights must move in exactly the same manner. All these flexural connections are frictionless. Secured to coordinating ring 117 is a loading disk 121 having a rim 122 with slots 123 into which radial springs 124 are loosely fitted. Springs 124 are attached at their inner ends to a hub ring 125 which is loosely journaled to hub 16 to allow rotation with respect thereto. Hub ring 125 has an abutment 126 having angle face 127 arranged to intersect the axis of speed-adjustment screw 128 which is threaded into hub 16.

Rotation of the adjusting screw forces ring 125 to turn slightly and springs 124 to deflect and exert a different force on rim 122 of disc 121 by way of slots 123. This change of force appears as a change in torque exerted on flyweight coordinating ring 117 attached thereto.

Cam ring 116 is rotatably supported in casing 14 by means of antifriction bearing 129. Stop pin 130 allows ring 116 to turn approximately 180°. Cylindrical cam surfaces 131 and 131' attached to ring 116 are arranged to contact cam follower rollers 132 secured to throttle vane shaft 133 by means of crank arm 134. Throttle vanes 27 are divided into two equal segments 180° each, one segment having follower rollers 132 secured to the outer side of crank arm 134 and the other segment of vanes 27 having their follower rollers 132 attached to the inner side of crank arm 134. Rollers 132 which are attached to the outer side engage outer cam 131 and rollers 132 attached to the inner side engage inner cam 131'. Coil springs 135 causes each throttle vane 27 to rotate towards the wide-open position. Stop abutment 136 engages extension 137 of crankarm 134 to limit the travel in the wide-open position.

The action of the throttle vanes 27 in response to rotation of cam ring 116 is as follows:

Each cam ridge 131 extends approximately 180°. The inner cam ridge 131' is located 180° from outer cam ridge 131. Referring to FIG. 5, it is seen that the cam closes each successive throttle vane individually. Furthermore, a throttle vane being closed by cam 131 is accompanied by an opposite throttle vane being closed by cam 131'. Thus two opposite vanes are always controlling and there are always two segments of closed and/or open vanes opposite each other.

Although the foregoing invention has been described in some detail by way of illustration and example for purposes of clarity of understanding, it is understood that certain changes and modifications may be practiced within the spirit of the invention and scope of the appended claims.

I claim:

1. Speed governing means comprising a rotor, rotor blades on said rotor, a set of auxiliary vanes to increase or decrease the flow of fluid to said rotor blades positioned adjacent said rotor blades, a cam follower arranged to move said vanes, a cam engageable by said cam follower and rotatable through a restricted angle, a first ring connected for movement with said cam, at least one weight rotatable with said rotor and movable radially outward relative to the axis of rotation of said rotor to frictionally engage said first ring and thereby control the movement of said cam, said weight being movable under the influence of centrifugal force upon rotation of said rotor, and mounting means connecting said weight and said rotor about a center eccentric to the axis of rotation of said rotor, said mounting means including a plurality of flexible members deformable under centrifugal force to permit outward movement of said weight.

2. Speed governing means in accordance with claim 1 which further comprises a plurality of weights rotatable with said rotor, one of said weights having a shoe disposed radially outward therefrom to engage said ring at a preselected centrifugal force and including coordinating means connected to each said weight to cause said weights to move equi-distances in response to the centrifugal forces created by the rotation of said rotor.

3. Speed governing means in accordance with claim 2 and including loading means resiliently opposing outward movement of said weights, and adjustable means for adjusting the force of said loading means opposing said outward movement.

4. Speed governing means comprising a rotor, rotor blades on said rotor, a set of auxiliary vanes to increase or decrease the flow of fluid to said rotor blades positioned adjacent said rotor blades, a plurality of cam followers attached to said auxiliary vanes, an annular cam-carrying member having at least one cam engageable by said cam followers, a first ring movable about its center with said cam-carrying member, a plurality of weights having shoes attached thereto movable radially toward and away from said first ring, a mounting plate rotatable with said rotor, and a plurality of deformable flexures connecting said weights to said mounting plates for movement about a center eccentric to said rotor.

5. Speed governing means in accordance with claim 4 and including an annular member, a plurality of flexible members, each fixed at one end to said annular member and at its opposite end to individual ones of said weights, and means biasing said annular members in a direction to urge said shoes radially inward away from said first ring.

6. Speed governing means in accordance with claim 5 and including a second ring rotatable with said rotor, a third ring spaced outwardly of said second ring and connected to said annular member, a plurality of flexible biasing members interconnecting said second and third rings, and cam means operable to bias said second ring relative to said rotor.

7. Speed governing means in accordance with claim 5 and including a second ring rotatable with said rotor, a third ring spaced outwardly of said second ring and connected to said annular member, a plurality of flexible biasing members interconnecting said second and third rings, adjustable means carried by said rotor and engageable with said second ring to rotationally shift said second ring relative to said rotor to control the force tending to retract said shoes from said first ring.

8. Speed governing means comprising a rotatable shaft, at least one shoe member rotatably associated with said shaft, a pair of angularly flexible links connecting said shoe to said shaft, a ring located outside the path of travel of said shoe member and frictionally engageable thereby at a preselected magnitude of unbalanced forces, said links being angularly disposed so that movement of said shoe member is about a virtual center of support located radially outside said ring, and means responsive to angular movement of said ring to control the rotation rate of said shaft.

9. Speed governing means comprising a rotor, blades on said rotor, a plurality of movable vanes operable to control the passage of fluid past said rotor blades, at least one fly weight flexibly mounted on said turbine rotor for rotation therewith, said flexible mounting including a plurality of flexible members deformable under the influence of centrifugal force to permit radial movement of said fly weight with respect to said turbine rotor, and a ring movable with said moving vanes and supported adjacent the peripheral path traversed by said fly weight, said fly weight moving outwardly to engage said ring at a preselected angular velocity thereby to cause said ring to position said movable vanes to reduce the speed of said turbine rotor by regulating the passage of fluid.

10. Speed governing means comprising a rotor, a plurality of fly weights flexibly attached to the rotor, said means connecting the weight and the rotor including a plurality of flexible members deformable under centrifugal force to permit radially outward movement of said fly weight at preselected angular velocities, a frictional shoe attached to the radially outward edge of said fly weight, the axes of said flexible members intersecting at a virtual pivot point for said fly weight with respect to said rotor at a point radially outward of said shoe, a circular ring disposed adjacent the peripheral path of said fly weight shoe and engageable to rotate with said shoe beyond a preselected speed, and means responsive to the rotation of said ring to reduce the rate of rotation of said rotor.

11. Speed governing means in accordance with claim 10 and including a second ring rotatable with said rotor, a third ring spaced outwardly of said second ring and connected to said flexible members, a plurality of flexible biasing members interconnecting said second and third rings, and adjustable means carried by said rotor to engage said second ring to shift said ring angularly relative to said rotor so as to control the bias force tending to urge said fly weight radially inward away from said first ring.

References Cited in the file of this patent
UNITED STATES PATENTS

| | | |
|---|---|---|
| 796,935 | Sandell | Aug. 8, 1905 |
| 1,305,882 | Cherington | June 3, 1919 |
| 2,569,898 | Millns | Oct. 2, 1951 |
| 2,612,757 | Teague | Oct. 7, 1952 |
| 2,620,156 | Parducci | Dec. 2, 1952 |
| 2,634,090 | Hardigg | Apr. 7, 1953 |
| 2,651,493 | Volk | Sept. 8, 1953 |
| 2,815,188 | Nelson | Dec. 3, 1957 |
| 2,816,731 | Dantowitz | Dec. 17, 1957 |
| 2,880,578 | Nardone | Apr. 7, 1959 |
| 2,939,017 | Teague et al. | May 31, 1960 |